Patented Feb. 15, 1944

2,341,846

UNITED STATES PATENT OFFICE 2,341,846

POLYHYDRIC ALCOHOL ETHERS OF ALIPHATIC POLYCARBOXYLIC ACID ESTERS AND THEIR PREPARATION

Edmund R. Meincke, Stamford, Conn., assignor to American Cyanamid Company, New York, N. Y., a corporation of Maine No Drawing. Application June 24, 1941, Serial No. 399,512

6 Claims. (Cl. 260—484)

This invention relates to polyhydric alcohol ethers of aliphatic polycarboxylic acid esters and their preparation.

I have found that the polyhydric alcohol ethers of aliphatic polycarboxylic acid esters may be prepared and that many of these compounds have surface-active properties which render them useful as wetting agents, detergents, surface tension reducing agents, emulsifying and dispersing agents, demulsifying agents, dye assistants and the like. Also, because of their non-ionic character, freedom from inorganic constituents, and other properties to be presently described, they are of considerable utility in those cases where cationic or anionic surface-active agents or those leaving a residue on decomposition cannot be successfully employed.

The new compounds of the present invention may be prepared by reacting an ester of a suitable unsaturated aliphatic polycarboxylic acid with a polyhydric alcohol, preferably in the presence of a catalyst. Di-n-octyl malate hexaethylene glycol monoether may be prepared, for example, by reacting hexaethylene glycol with di-n-octyl maleate as follows

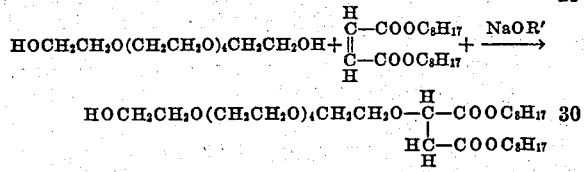

The catalyst, NaOR', is an alcoholate and R' represents any alkyl or alkoxy residue, but preferably that of the alcohol used in the reaction. The alcoholate catalyst may be supplied in various ways. For example, a small amount of metallic sodium may be dissolved in the polyhydric alcohol to be reacted with the unsaturated polycarboxylic acid ester, or the sodium metal may be dissolved in an alcohol such as tertiary butyl alcohol and then added to the polyhydric alcohol. An alternative method of providing catalysts for the reaction is to react the polyhydric alcohol of the reaction, or an aliphatic alcohol, or a mixture of the same, with NaOH with elimination of water formed by the reaction. The alcoholate thus formed may then be employed as the reaction catalyst.

The reaction of the present invention may require from 5 minutes to several days for completion depending upon the reactants employed, temperature, catalyst, etc. As the preferred compounds of the present invention are water-soluble a simple guide for the completion of the reaction is to carry out the reaction until the product is water-soluble. Ordinarily it is desirable to neutralize the catalyst with a weak acid at the completion of the reaction and remove unreacted materials by evaporation, distillation and/or extraction with suitable solvents such as petroleum ether.

The polyhydric alcohols which may be employed in accordance with my invention include the various glycols such as ethylene glycol, propylene glycol, butylene glycol, etc. and the various polyalkylene glycols having the general formula $$HO(CH_2)_xO[(CH_2)_xO]_n(CH_2)_xOH$$

in which $n$ and $x$ are integers, $x$ being 2, 3 or 4 and $n$ is at least 2. Examples of polyalkylene glycols falling within this group are tetraethylene glycol, hexaethylene glycol, dodecaethylene glycol, tetrapropyene glycol, hexapropylene glycol, tetrabutylene glycol, etc. Other polyhydric alcohols which may be employed include glycerol, erythritol, pentaerythritol, di-pentaerythritol, arabitol, sorbitol, mannitol, etc.

The esters of unsaturated polycarboxylic acids which may be employed include the alkyl esters of maleic acid, fumaric acid, citraconic acid, mesaconic acid, itaconic acid, glutaconic acid, aconitic acid, muconic acid and other unsaturated aliphatic polycarboxylic acids having an activating group adjacent to a double bond. Ordinarily I employ the dialkyl esters of dicarboxylic acids but it is possible to employ the trialkyl esters of tricarboxylic acids or even the monoalkyl esters of polycarboxylic acids by blocking off the unesterified acid groups, as with NaOH, and then preparing the monoether as previously described. The blocked off acid group may then be restored by hydrolysis, or otherwise.

When my new compounds are to be used principally on account of their surface-active properties as wetting agents, dispersing agents, demulsifying agents, etc. it is desirable that they have a particularly balanced structure. The alkyl groups of the polycarboxylic acid ester should contain at least 3 carbon atoms in each alkyl chain in order that the resulting compound may have the necessary hydrophobic properties required by a successful wetting agent. Best wetting and dispersing properties are obtained when the alkyl groups are of about 8 carbon atoms as in the case of di-n-octyl malate hexaethylene glycol. The compounds are best as detergents when the alkyl groups are longer. It is also desirable that the polyhydric alcohol residue have sufficient hydrophilic properties. I have found that the polyalkylene glycols when reacted with polyhydric esters of polycarboxylic acids as previously described give excellent wetting and dispersing agents, the preferred ones being polyethylene glycols of the formula $$HOCH_2CH_2O(CH_2CH_2O)_nCH_2CH_2OH$$

in which $n$ is an integer not less than 2. From the above it will be seen that the preferred compounds of my invention may be represented by the formula

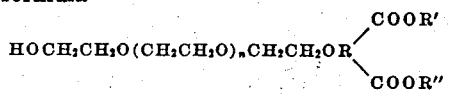

in which R' is an alkyl radical containing at least 3 carbon atoms, R" is a member of the group consisting of H and salt-forming and alkyl radicals, R is the residue of an aliphatic polycarboxylic acid and $n$ is an integer not less than 2. The length of the polyalkylene chain may be increased by condensation with ethylene glycol after the monoether has been formed if it is so desired.

The preparation of representative members of my new class of compounds will now be illustrated in connection with the following specific examples which are given by way of illustration and not of limitation of the broader aspects of my invention as set forth in the appended claims.

*Example 1*

52 parts by weight of dodecylethylene glycol, 34 parts by weight of di(2-ethyl hexyl) fumarate and 50 parts by weight of tertiary butyl alcohol to which had been added 1 part of Na metal, were mixed and heated to 70° C. for 10 minutes. The reaction mixture was neutralized with a small amount of acetic acid and the butanol was evaporated off. The product was a yellow colored oily material which gave the following results for wetting power in the standard Draves wetting test.

| Conc. g./liter | Wetting time in seconds |
|---|---|
| 1.0 | 87.0 |
| 1.5 | 47.0 |
| 2.5 | 32.0 |
| 5.0 | 22.8 |

*Example 2*

38 parts by weight of hexaethylene glycol and 5 parts of tertiary butyl alcohol containing 0.2 part of sodium metal were mixed and 34 parts of di(2-ethylhexyl) maleate were added thereto. The temperature of the reaction mixture was maintained at about 35–40° C. for ten minutes and the material was then neutralized with acetic acid. A yellow oil having an index of refraction at 25° C. of 1.4622 was obtained which was soluble in water in all proportions. In the Draves test the product showed the following wetting properties.

| Conc. g./liter | Wetting time in seconds |
|---|---|
| 0.25 | 127.0 |
| 0.5 | 72.5 |
| 0.75 | 41.0 |
| 1.0 | 35.0 |
| 1.5 | 16.0 |
| 2.0 | 13.5 |
| 3.0 | 7.8 |

*Example 3*

211 parts by weight of hexaethylene glycol and 1 part of powdered NaOH were heated together under a vacuum of 1 mm. pressure at 160° C. for 20 minutes. The material was then cooled to 90° C. and 266 parts of di(n-octyl) maleate was added with agitation. After 5 minutes reaction time 3 parts of water and 1.5 parts of acetic acid was added. The product, a viscous dark oil, had a specific gravity of 1.019 and an index of refraction at 25° C. of 1.4567. It contained 3.9% excess hexethylene glycol and 95% of di(n-octyl) maleate hexaethylene glycol monoether.

This same product was also prepared with metallic sodium in tertiary butyl alcohol as catalyst as described in Examples 1 and 2. It had good wetting and emulsifying properties.

*Example 4*

50 parts by weight of hexaethylene glycol and 78 parts by weight of tertiary butyl alcohol were mixed and 1 part of metallic Na was added and dissolved therein. 78 parts of dioctyl fumarate was then added and the mixture heated under a reflux condenser at 95° C. for 48 hours until the reaction mixture was completely water-soluble. The excess butanol was then distilled off, 50 parts of water added and the solution extracted with petroleum ether. The product was an excellent wetting agent and was found to be capable of suspending calicum soaps even after they had been precipitated.

*Example 5*

99 parts by weight of di(n-decyl) maleate, 94 parts of anhydrous hexaethylene glycol and 4 parts of sodium metal were mixed and reacted at about 90° C. for 10 minutes. The product, di-n-decyl malate hexaethylene glycol monoether, was a good emulsifying and wetting agent.

*Example 6*

78 parts by weight of dioctyl maleate, 50 parts anhydrous hexaethylene glycol and 78 parts tertiary butyl alcohol containing 0.5 part of sodium metal were mixed and heated under a reflux condenser at 82° C. for 21 hours. The reaction mixture at this point was acidic and 0.25 part of Na metal dissolved in 15 parts of butanol was added. The reaction was continued for 6 more hours and the butanol then distilled off. 75 parts of water was added to the product and the excess dioctyl maleate extracted with petroleum ether.

*Example 7*

25 parts by weight of hexaethylene glycol and 5 parts of NaOH were heated to 25° C. in a vacuum of 30 mm. using an ice trap to catch water from the reaction mixture. 10 parts by weight of the above described reaction mixture was heated with 50 parts of hexaethylene glycol to 100° C. 68 parts of dioctyl maleate was then added slowly with stirring to the glycol and catalyst over a period of 5 minutes. The reaction mixture was then neutralized with a small amount of acetic acid. The product, dioctyl malate hexaethylene glycol monoether, was obtained with a yield of 90%.

*Example 8*

49 parts by weight of tetraethylene glycol and 10 parts of NaOH were heated to 90° C. under 30 mm. pressure until the NaOH was dissolved and 4 parts of water had distilled off. 10 parts by weight of the above solution, 29 parts of tetraethylene glycol and 68 parts of di(2-ethyl hexyl) maleate were mixed and heated to 90° C. for one hour at the end of which time the product was completely soluble in water. This product showed good wetting properties in the Draves test.

*Example 9*

76 parts by weight diamyl maleate, 92 parts by weight of tetraethylene glycol and 10 parts by weight of the catalyst solution described in Example 8 were heated for 5 minutes at 90° C. at which point the product was completely soluble in water. The reaction mixture was then neutralized with 1 part of acetic acid and 2 parts of water. A yield of 74.5% of diamyl malate tetraethylene glycol monoether was obtained. The following results were obtained in the Draves wetting test with this product.

| Conc. g./liter | Wetting time in seconds |
|---|---|
| 1 | 83 |
| 2 | 37 |
| 3 | 25 |
| 5 | 5 |

Example 10

Diamyl malate hexaethylene glycol monoether was prepared by heating 51 parts by weight diamyl maleate, 50 parts of hexaethylene glycol and 40 parts of tertiary butyl alcohol containing dissolved therein 0.2 part metallic sodium, on a steam bath for 19 hours. The butanol was then distilled off from the reaction mixture and the product was treated with 50 parts of water and extracted with 50 parts by volume of petroleum ether and then with 25 parts by volume of petroleum ether.

Example 11

50 parts by weight of hexaethylene glycol and 50 parts of tertiary butyl alcohol were mixed and 0.5 part of Na metal dissolved therein. 56.8 parts of n-hexyl maleate was then added and the mixture heated 5½ hours. One part of glacial acetic acid dissolved in 2 parts of water was then added and the butanol evaporated on a steam bath. The product was water-soluble and possessed good wetting properties.

Example 12

The ability of my new non-ionic wetting agents to stabilize soaps against curd formation upon precipitation with calcium salts is shown in the following table. In this series of tests 10 cc. portions of a 1% soap solution were mixed with amounts of my wetting agents sufficient to provide a concentration of wetting agent in the soap solution as indicated by the various values in the table. To the treated soap solution was added 10 ccs. of an 0.2% solution of calcium chloride. In the table the symbol IC indicates the immediate formation of calcium soap curds, C indicates the formation of curds and S indicates that no curds were formed, i. e. the calcium soap was held in suspension. Observations were made after the mixture had been allowed to stand for one hour. Observations were also made at the end of a 24 hour period but are not given since they were substantially the same as for the 1 hour test period.

| Wetting agent | Concentration, per cent | | | | | |
|---|---|---|---|---|---|---|
| | 0.0 | 0.031 | 0.063 | 0.125 | 0.25 | 0.5 |
| Diamyl malate hexaethylene glycol | IC | C | C | C | S | S |
| Di-n-hexyl malate hexaethylene glycol | IC | C | C | S | S | S |
| Di(2-ethyl hexyl) malate hexaethylene glycol | IC | C | S | S | S | S |
| Di-n-octyl malate hexaethylene glycol | IC | S | S | S | S | S |
| Di-n-decyl malate hexaethylene glycol | IC | IC | IC | S | S | S |

When tested by quantitative titrations, it was found that a 0.25% solution of an olive oil soap which had a calcium tolerance of 146.3 P. P. M. had a calcium tolerance with 0.01% of di(2-ethyl hexyl) malate hexaethylene glycol monoester of 450 P. P. M.

Compounds of the present invention may, in general, be employed in the same way as other wetting or surface tension reducing agents, detergents, emulsifying and dispersing agents, demulsifiers and the like. Their water-soluble and non-ionic characteristics enable them to be used in cases where compounds not possessing these properties are at a disadvantage. Absence of inorganic constituents such as sodium and potassium, sulfonic acid radicals and the like may also make these compounds of utility in particular instances. They are stable in acid solutions of reasonable strength and withstand the action of mild alkalies for fairly long periods of time. The various arts in which the compounds of the present invention may be used commercially are widely diversified and it is not feasible to give a complete list of all of the possible uses to which the various members of my new class of compounds may be employed. The following paragraphs however give in outline form some of the more important uses of the compounds of my invention.

As wetting agents the compounds of the present invention may be employed alone or in admixture with other wetting agents, solvents, solubilizing agents, detergents, etc. They may be used in the textile industry in the treatment of textiles and textile fibers such as cotton, wool, silk, cellulose esters and ethers, synthetic wool and silk, hemp, jute, flax, etc. as wetting, penetrating, softening and carbonizing agents. My compounds may also be applied in the leather industry for wetting out, softening or soaking hides, as aids in deliming, bating, tanning and dyeing, as well as in fatliquoring and stuffing preparations.

In the paper industry they may be used as introflers to aid in the penetration of wood chips, in the bleaching of wood pulp, as deflocculating agents for the fibers to assist in uniform felting, in the washing of felts, in coating compositions, in glassine paper, to increase the absorbency of paper towels, in the recovery of broke and other sized and printed stocks, as additions to the beater to promote hydration of the fibers and the wetting of pigments and fillers, etc.

My compounds are also of value in insecticides and disinfectants which are difficultly dispersed in water. They may be used in admixture with mercury, zinc, cadmium or bismuth salts and other bacteriostatic materials and they are of value on account of the penetrating and spreading qualities they impart to the solution. In agricultural sprays comprising lead and calcium arsenates, fluorides, copper oxides, etc. they are of value because of the more uniform coverage which their use promotes.

Still another important field in which the compounds of my invention may be used is in photography. They may be added to photographic developers, to fixing solutions, toning solutions, blueprint solutions and the like. They may also be used as solutions in water and in organic solvents for the pretreatment of sensitized or exposed films before developing.

An obvious use of the compounds of my invention as wetting agents is to aid in the wetting of dry powdered materials such as dyes, pigments, fillers, carbon black, casein, glue, powdered milk, eggs, cocoa, beverage bases, coal dust, metallurgical fume dust, cement, etc.

Compounds of my invention are also useful in electroplating baths, storage batteries and electrolytic cells to reduce occlusion of the surface by generated gases. They may also be used in pickling baths, rinsing agents, cutting oils and the quenching of hot metals where the presence of a cationic material might induce corrosion or produce other difficulties.

As emulsifying and dispersing agents the compounds of the present invention may also be used alone, or in admixture with other emulsifying and dispersing agents such as casein glue, gum tragacanth, locust bean gum, sulfonated vegetable and mineral oils, soaps and the like. They are particularly useful in the preparation of pigment and dye emulsions and pastes used for printing in the printing of paper, textiles and other objects. In such connection they may be employed with solutions or dispersions of various resins such as alkyd resins, urea-formaldehyde resins, melamine-formaldehyde resins, phenol-formaldehyde resins, rosin, hydrogenated rosin and others in the formulation of paints, lacquers and varnishes. Similar resinous emulsions or dispersions as well as those containing various types of waxes may be used with my wetting agent in the sizing of paper and textiles and in the preparation of coating compositions. Other wax emulsions and dispersions containing my wetting agents are useful as furniture polishes, floor polishes, shoe polishes, leather treating materials, lipstick, rouge and other cosmetic preparations. Emulsifying of various mineral and vegetable oils may be aided by the presence of emulsifying agents of the present invention. Asphalt and creosote may be emulsified to provide penetrating and coating compositions for concrete, masonry, wood, paper and other materials. The monoethers of the present invention may also be used as dispersing agents in concrete mixes to increase the plasticity of the same for use in grouting and in oil well cementing.

The compounds described herein are particularly useful as demulsifying agents as for example in the breaking, or resolving, of emulsions of the water-in-oil type such as the crude petroleum emulsions frequently encountered in oil well drilling operations and also in oil storage tanks. In a related field aqueous solutions of my wetting agent are useful in flooding oil bearing sand for the recovery of crude petroleum remaining therein as well as in the acidizing of oil wells and in the preparation of oil well drilling mud.

The monoethers described may be used as the sole treating agent, preferably in solution in water or in other solvents or emulsifying agents such as phenols, glycerols, mineral oils, solutions of phosphate salts such as disodium phosphate, tetrasodium pyrophosphate, sodium hexametaphosphate and the like. They may also be used in conjunction with or in admixture with other wetting or emulsifying agents such as mono- or polyalkyl, aryl or hydroxyaryl naphthalene mono- or polysulfonic acids and their salts and condensation products with higher aliphatic or cycloaliphatic substituted or unsubstituted aminoamidines or ketones or with aldehydes such as formaldehyde or with polyhydric alcohols or with higher unsaturated or hydroxy fatty acids or their salts, esters or amides.

In detergent compositions my compounds are useful not only on account of their wetting, emulsifying and detergent properties but also on account of their ability to keep calcium soaps in suspension. As indicated in Example 12 the compounds of the present invention are valuable when used with common soaps which upon treatment with calcium salts normally tend to precipitate insoluble calcium soaps. My compounds also have detergent properties of their own and tend to increase the detergent action of compounds with which they may be admixed. The detergency of my compounds is dependent in part on the presence of at least one hydrophobe group in the molecule of considerable length and accordingly those compounds having the best detergency will contain one or more alkyl groups of from 8 to 20 carbon atoms in the ester portion of the molecule.

Because of the wetting and detergent qualities of my compounds they are suitable for use in tooth powders, silver polishes, and household cleaners containing mild abrasives, diatomaceous earth, seismotite, chalk, pumic, etc. They may of course also be used in tooth pastes, liquid dentifrices, shampoos, window cleaners, etc. Because of their acid and alkali stability they may be used in the washing of fruit for the removal of spray residue, etc.

Esters of the monoethers of the present invention are resistant to hard water and are therefore well suited as addition agents to dye baths for the purpose of obtaining more level dyeings. They may also be used in the soaping or after-treatment of dyed fabrics and also as colloidizing agents in the printing, padding and dyeing of textile fibers, e. g. in solutions containing such dyes as naphthol A. S., for application to textiles by the padding process; as assistants in dyeing cellulose acetate with dispersed insoluble dyestuffs; as penetrating agents in the mordanting of textiles, as wetting agents in reducing baths containing vat dyes and in baths for the lustering or delustering of acetate silk. In dyeing operations they may also be used to deflocculate the pigment press cake, to improve the wetting characteristics of dried pigment, to induce better grinding qualities and to help in the breaking of the press cake into oil bases. An analogous use is in the grinding of pigments with oils in the preparation of paints and lacquers.

In ore dressing operations the compounds of the present invention are useful on account of their surface active properties and in the flotation of minerals, cyaniding, amalgamation, leaching operations, grinding, sizing, tabling and other operations.

My compounds are useful in the promotion of chemical reactions where wetting is a preliminary condition to chemical reaction as where the reactants are in two different phases which may or may not be miscible. Typical reactions in which the surface active agents of the present invention may be employed are for example in the hydrolysis of starches, sugars, oils, etc.; retting operations; hydration, such as the slaking of lime, setting of plaster, cementing, etc.; leaching and extracting; and chemical reactions generally such as in esterifications, sulfonations, chlorinations, diazotization coupling reactions, addition reactions, reducing reactions, etc. as for example the sulfonation of esters of unsaturated aliphatic di- and polycarboxylic acids by the use of aqueous sodium sulfite or bisulfite which reaction may be effected in a shorter time by the addition of one of the surface active agents of the present invention. Other uses will of course suggest themselves to those skilled in the art.

What I claim is:

1. A hydroxylated polyakylene glycol monoether of an alkyl ester of an aliphatic polycarboxylic acid, said compound having the formula

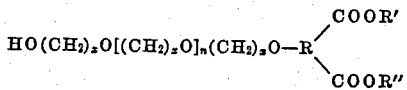

in which $n$ and $x$ are integers, $x$ being 2 to 4 inclusive and $n$ being 2 to 10 inclusive, R is the residue of an aliphatic polycarboxylic acid and R' and R" are alkyl radicals of 3 to 10 carbon atoms inclusive.

2. A hydroxylated polyalkylene glycol monoether of an alkyl ester of an aliphatic dicarboxylic acid, said compound having the formula

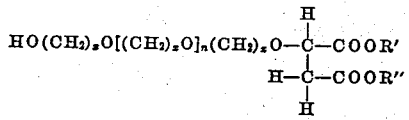

in which $n$ and $x$ are integers, $x$ being 2 to 4 inclusive and $n$ being 2 to 10 inclusive, and R' an R" are alkyl radicals of 3 to 10 carbon atom inclusive.

3. A hydroxylated polyalkylene glycol mono ether of an alkyl ester of an aliphatic dica boxylic acid, said compound having the formul

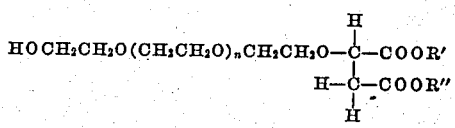

in which $n$ is an integer of 2 to 10 inclusive an R' and R" are alkyl radicals of 3 to 10 carbo atoms inclusive.

4. Di-n-octyl malate hexaethylene glyc monoether.

5. Di(2-ethyl hexyl) malate hexaethylen glycol monoether.

6. Di-n-octyl malate tetraethylene glyc monoether.

EDMUND R. MEINCKE.